Figure 1:
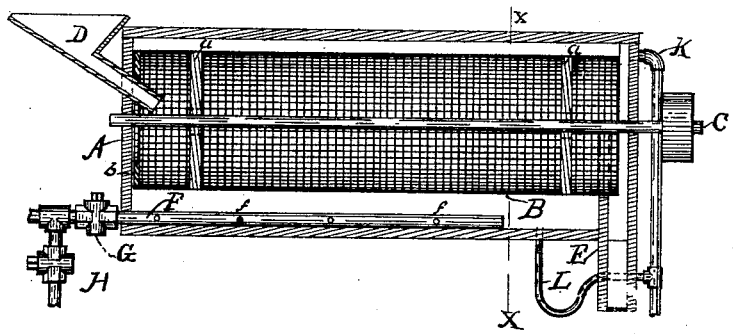

(No Model.)

C. F. BINDER, Dec'd.
C. F. BINDER, Administratrix.
PROCESS OF EXTRACTING OIL.

No. 434,696. Patented Aug. 19, 1890.

Witnesses
A. P. Wood

Inventor
Charles Frederich Binder
By Albert A. Wood, his Att'y

UNITED STATES PATENT OFFICE.

CHARLES FREDERICK BINDER, OF EDGEWOOD, GEORGIA; CHARLOTT F. BINDER ADMINISTRATRIX OF SAID CHARLES F. BINDER, DECEASED.

PROCESS OF EXTRACTING OIL.

SPECIFICATION forming part of Letters Patent No. 434,696, dated August 19, 1890.

Application filed November 13, 1886. Serial No. 218,825. (No model.)

*To all whom it may concern:*

Be it known that I, CHARLES FREDERICK BINDER, a citizen of the United States, residing at Edgewood, in the county of DeKalb and State of Georgia, have invented a new and useful Process for Preparing Animal or Vegetable Substances for the Extraction of Oil; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

It is my object by this invention to so improve the process of preparing oil-producing vegetable and animal substances as to increase the value of the product by increasing the quality of the oil or grease and also its quantity, by reason of which the quantity of residuum is reduced and its percentage of nitrogen increased.

My improvement consists in applying the dry or superheated steam directly to the material from which the oil is to be extracted for a sufficient length of time only to open the oil-cells, when the material is taken to any approved press and the oil extracted by pressure. In continuing the application of steam to the material for a sufficient length of time to open the oil-cells the material is sufficiently heated to liquefy the oil or grease.

The most approved practice has heretofore been, in preparing animal fat or oleaginous seeds for the extraction of oil by pressure, to heat them sufficiently by any means—generally in a steam-jacketed vessel—to liquefy the oil or grease, thus rendering its expression more easy by reason of its greater fluidity. This system, however, of heating the substance from which oil or grease is to be extracted by dry heat has but the one advantage of rendering the oil or grease more fluid, while it has the disadvantage of closing the oil-cells. It has also been customary to subject animal fat to the direct action of steam in a digester until the water of condensation shall have digested the material and floated the oil on the top, whence it may be drawn off by cocks as it accumulates. The latter process, however, besides separating the oil or grease from other substances contained in the digester, dissolves the gelatine matter, which is consequently drawn off with the water, and with it any nitrogenous matter that it may contain, leaving as refuse, if this process is continued, only calcium-phosphate.

It is the purpose of my invention to liquefy the oil in the cells and open them, by reason of which the oil or grease will be more easily expressed and at the same time minimize the amount of the water of condensation. I accomplish this result in various ways, several of which I illustrate in the accompanying drawings. It may, however, be accomplished in other ways, the discovery being the introduction of dry steam and its escape before condensation, heating and expanding the cellular tissue, and providing for the more ready extraction of the oil by pressure. An excess of moisture also is driven out of the material by the use of very dry or superheated steam or by the application of external heat by either a steam-jacket around the vessel in which the material is treated or by other means; but it is not necessary to apply external heat in any case if the steam is of sufficiently high temperature.

Figure 2:
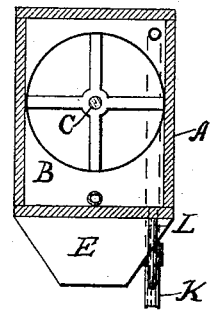

In the accompanying drawings, Figure 1 is a longitudinal vertical section of the preferred apparatus in case a continuous supply of heated and expanded material is required; and Fig. 2 is a section on the line X X, Fig. 1. Figs. 3, 4, 5, and 6 are modifications showing other ways in which the process may be carried out.

In the figures, similar reference-marks referring to like parts in the several figures, A represents a box or casing; B, a perforated cylinder attached to the shaft C and driven by a pulley or gear.

D is a spout through which the material to be acted on is put into the cylinder. The inner end of the spout D, which enters the cylinder, does not project sufficiently therein to come in contact with the arms *a a*, projecting radially from the shaft C and supporting said cylinder. The spout therefore does not in any way interfere with the revolution of said cylinder. If desired, an inwardly-projecting annular flange *b* may be placed in the end of the cylinder to prevent any of the material falling therefrom as it leaves the spout. The revolution of the cylinder will tend to level the material, by reason of which it will be carried toward the end of the cylinder opposite the spout E, whence it will be discharged through the spout E. The sides of the outer casing should be close to the perforated cylinder in order that the steam in rising will pass through the material to be treated. It is obvious that the more rapidly the cylinder runs the more rapidly the material will be discharged from the cylinder.

F is an inlet-pipe for the steam, and is provided with a valve G to govern the amount of steam that will pass through it.

H is a valve to draw off any water that may condense in the pipes while standing, in order that nothing but dry steam shall be admitted.

K is a waste-steam pipe to carry off any steam or other vapor which may rise from the material in the cylinder.

L is a pipe for the escape of any water that may come from the steam-pipe F or that may condense in the bottom of the case A. The pipe L is preferably bent to form a steam-trap to prevent the escape of steam. The steam-pipe F discharges its steam through the perforations *f* in the pipe for the purpose of distributing the steam through nearly the entire length of the case.

Figure 3:
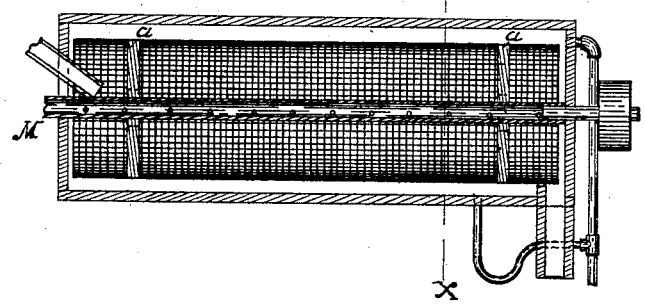
Figure 4:
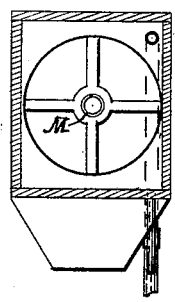

Figs. 3 and 4 are the same as Figs. 1 and 2, except that the shaft M is a pipe and is provided with perforations through which to discharge the steam into the interior of the perforated cylinder. The inlet-pipe, which is connected to this hollow shaft, should be provided with a valve H, the same as in Fig. 1, to draw off any condensed water that might be in the pipes.

Figure 5:
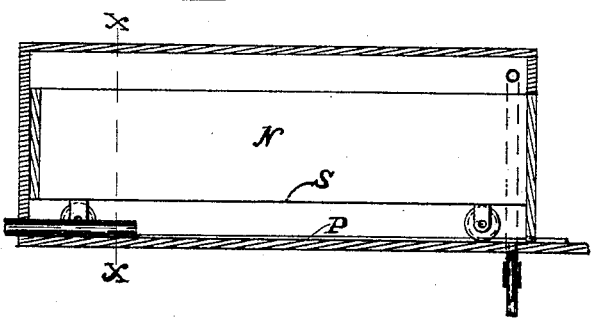
Figure 6:
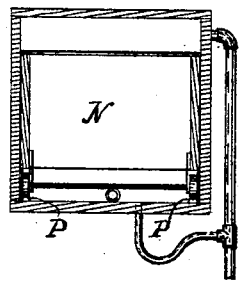

In Figs. 5 and 6 a car N with a perforated bottom S is shown that is filled with material to be treated and is run into the box, and after being heated is run out and discharged. The inlet and outlet pipes of this box are similar to those shown in Figs. 1 and 2.

By using superheated steam not only will the oil be more highly heated and run more freely, but the addition of water to the material or to the oil is avoided. When moisture or water is admitted, as is the case if wet steam be employed, a portion of the oil takes the form of an emulsion, and cannot be readily recovered in the form of oil by the subsequent pressing operation. Moreover, such excess of moisture lowers the grade of the residuum for fertilizing purposes, whereas when produced by my process the residuum will be materially higher in ammonia. The superheated steam also acts to modify or separate the tarry matter in the oil, so that it will remain in the cake when the oil is expressed.

It is found by experience that by the application of steam as herein described from five to fifteen per cent. more oil or grease will be liberated and the bulk of refuse be reduced by that amount of matter, none of which is nitrogenous, and the percentage of nitrogen in the refuse is thereby increased, making it more valuable for fertilizing purposes.

I am aware that it has been proposed to introduce steam or other moistening agents among oleaginous seeds for the purpose of softening their outer covering, and thus facilitating the extraction of oil therefrom, as described in the patent to Lawther April 23, 1878, and I hereby disclaim the process therein described.

Having thus described my invention, what I claim as new, and desire to secure by Letters Patent of the United States, is—

1. The herein-described process for the extraction of oil, consisting in subjecting the material from which the oil is to be extracted to direct contact with superheated or dry steam of such a high temperature that only sufficient moisture is applied to the material to take the place of the oil in the cells, and then expressing the oil, substantially as set forth.

2. The herein-described process for the extraction of oil, consisting in subjecting the material from which the oil is to be extracted to direct contact with superheated or dry steam, and thereby opening the oil-cells and preparing the material for the extraction of the oil without moistening it, and then expressing the oil by mechanical force, substantially as set forth.

3. In the extraction of oil, the improvement which consists in subjecting oleaginous material to the direct action of steam, and thereby opening the oil-cells without moistening the material treated, and then expressing the oil, as set forth.

In testimony whereof I affix my signature in presence of two witnesses.

CHARLES FREDERICK BINDER.

Witnesses:
 S. L. HILLYER,
 A. P. WOOD.